United States Patent [19]

Bigney

[11] 4,134,488
[45] Jan. 16, 1979

[54] FASTENING DEVICE FOR TROUGHING ROLL OF A CONVEYOR BELT SYSTEM

[75] Inventor: Ernest N. Bigney, Mt. Royal, Canada

[73] Assignee: Jeffrey Manufacturing Division Dresser Industries Canada Ltd., Montreal, Canada

[21] Appl. No.: 766,862

[22] Filed: Feb. 9, 1977

[30] Foreign Application Priority Data

Feb. 17, 1976 [CA] Canada .................................. 245892

[51] Int. Cl.² ............................................. B65G 15/08
[52] U.S. Cl. ................................................. 198/827
[58] Field of Search ................................. 198/827, 824

[56] References Cited

U.S. PATENT DOCUMENTS

| 3,038,588 | 6/1962 | Arndt et al. | 198/827 |
| 3,430,755 | 3/1969 | Allendorf | 198/825 |
| 4,043,447 | 8/1977 | Donnelly et al. | 198/827 |

FOREIGN PATENT DOCUMENTS

| 1203674 | 8/1965 | Fed. Rep. of Germany | 198/827 |
| 1260370 | 2/1968 | Fed. Rep. of Germany | 198/827 |
| 1260371 | 2/1968 | Fed. Rep. of Germany | 198/827 |
| 861000 | 2/1961 | United Kingdom | 198/827 |

Primary Examiner—Robert W. Saifer
Assistant Examiner—Douglas D. Watts
Attorney, Agent, or Firm—Larson, Taylor and Hinds

[57] ABSTRACT

A fastening device is disclosed for supporting a catenary troughing roll assembly for a conveyor belt mounted on a fixed support frame. The fastening device includes a plate pivotally mounted intermediate of its length on the fixed support frame, the adjacent end shaft of the roll assembly is connected to one end of the plate by a connector means and the opposite end of the plate is locked in one position by a locking means mounted on the fixed frame. The locking means, when released from the plate, permits the plate to rotate and lower the roll assembly from contact with the conveyor belt. Means are provided to accommodate conveyor belts of various widths within the space between the fixed frames and to vary the angle of the troughing roll assembly.

9 Claims, 10 Drawing Figures

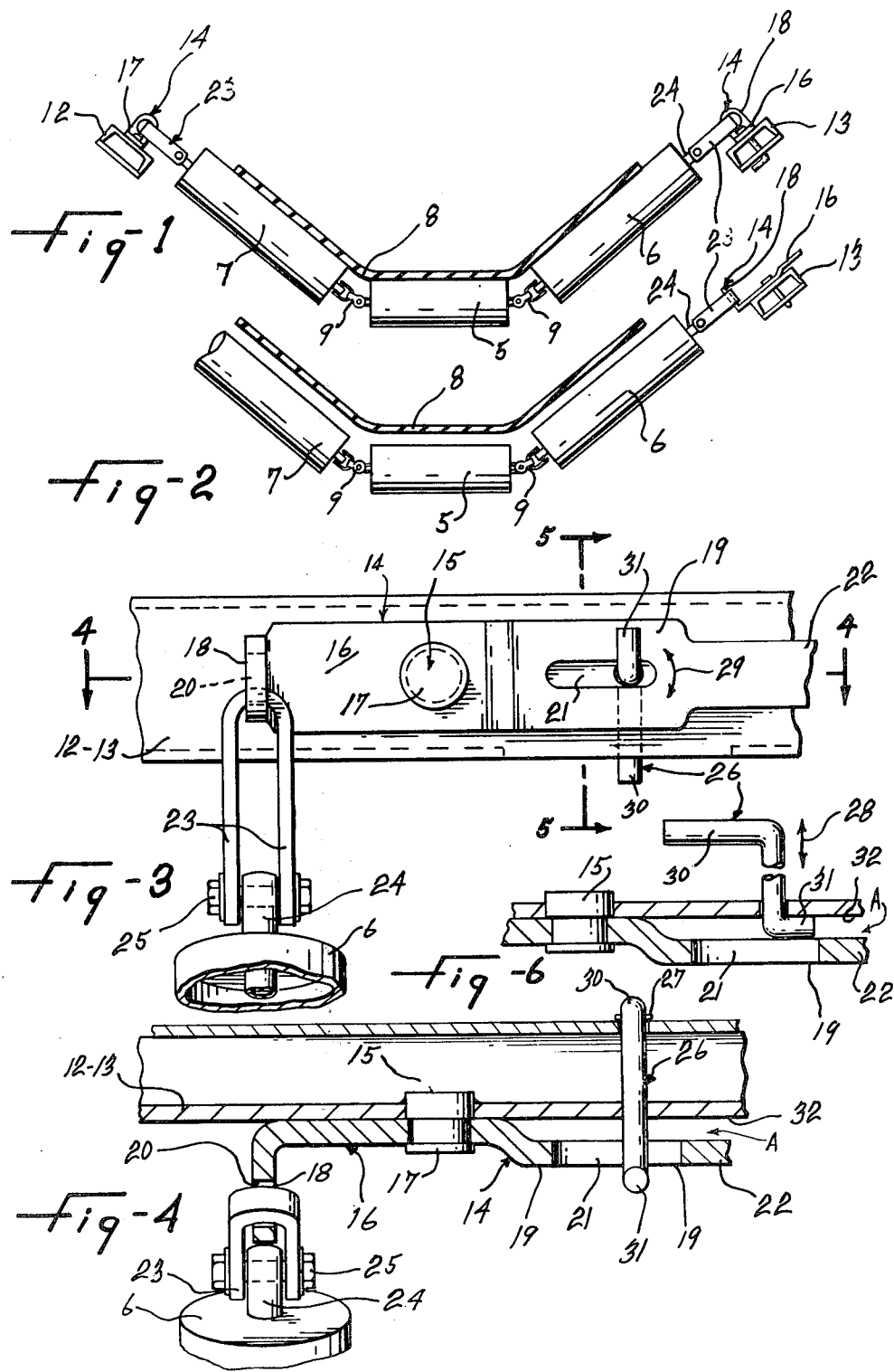

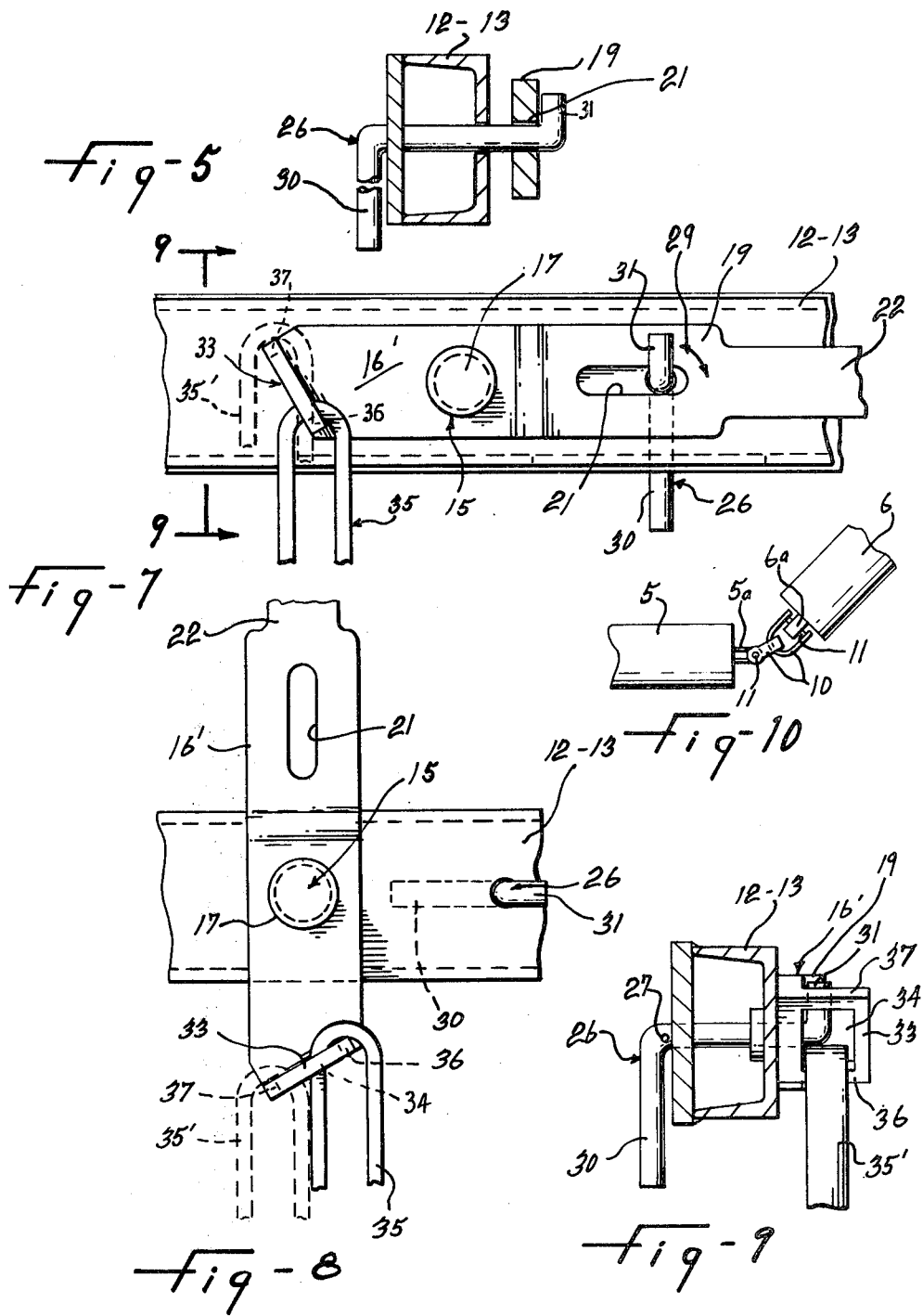

FASTENING DEVICE FOR TROUGHING ROLL OF A CONVEYOR BELT SYSTEM

This invention relates to fastening devices for the mounting of catenary troughing rolls for a conveyor belt assembly on a stationary frame structure and specifically to fastening devices adapted for quick release of the troughing rolls from under a conveyor belt.

In troughing roll conveyor belt assemblies, it is essential that provision be made to accommodate movement between the troughing rolls and the stationary frame structure caused by variable traction between the conveyor belt and the supporting roller assembly due to variation of the weight of material being carried by the conveyor belt.

Fastening devices for supporting the troughing rolls on a stationary frame structure which will accommodate movement transmitted through the conveyor belt and fastening devices are known. Typical supporting frames for catenary idler roller assemblies are designed with suspension center distances to accommodate the belt width and angle of the catenary idler rolls. This restricts later change in the belt width or troughing angle because of the hardware configuration of the catenary idlers typically in use. One such device is illustrated in Canadian Pat. No. 831,356 granted to Marcel Allendorf on Jan. 6, 1970. In the device illustrated in this patent, link means engage with a fixed pivot mounted on a support frame. The link means has a central window having multi-formed peripheral surfaces, a shackle connecting the link means with the shaft of a roller whereby in one position the distance between the pivot mounting and the roll shaft is shortened to hold the roller assembly in the operative position and in the other non-operative position, the link is rotated and the distance between the pivot and the roll shaft is lengthened.

The present invention brings the art of conveying with catenary idlers into the perspective of using support frames with standard dimensions (belt width plus fifteen (15) inches) combined with a simple plate pivotally mounted intermediate of its length on at least one side of a stationary frame structure with one end of the pivoted plate being connected through a connecting means to the shaft of an angularly disposed roll of a troughing roll assembly, while the opposite end of the pivoted plate, in the operative position of the troughing roll assembly, is held secured to the stationary frame structure by a quick release member mounted on the stationary frame structure and engageable with the plate to hold the plate and the troughing roll assembly in operable position against the underside of the conveyor belt. When the quick release member is released from the plate, the plate rotates about its pivot mounting and the troughing roll assembly drops by gravity away from contact with the conveyor belt, thus permitting replacement or repair of the troughing roll assembly while the conveyor belt is kept running. The end of the plate which is engaged by the quick release member is offset away from and parallel with the adjacent surface of the stationary frame structure to provide space for that portion of the quick release member withdrawn from engagement with the plate.

The present invention provides a fastening device for securing at least one end shaft of a catenary troughing roll assembly to a fixed side frame for support of a conveyor belt, the fastening device comprising a suspension plate pivotally mounted intermediate of its length on the fixed side frame, connecting means suspended from one end of the suspension plate and pivotally secured to the end shaft of the catenary troughing roll assembly, and locking means mounted on the fixed frame and engageable with the other end of the suspension plate opposite from the connecting means, the locking means in one position holding the troughing roll assembly to support the conveyor belt in an operative location and in the other position permitting rotation of the suspension plate and lowering the roll assembly from contact with the conveyor belt.

An object of the present invention is to provide a fastening device for troughing rolls supporting a belt conveyor which is simple in structure, cheap to manufacture and which can be quickly released from the operable position to permit the troughing rolls to drop from contact with the conveyor belt for quick repair and servicing of the troughing rolls while the belt continues running.

A further object of the invention is to provide a fastening device which is pivotally mounted intermediate of its length and at one end has provision for support of one end of a roller assembly and is engageable at its other end by a quick release member to permit the device to pivot.

In another embodiment there is provided a catenary idler suspension system for conveyors using supporting frames of standard dimensions in which the suspension system accommodates to change in belt width or troughing angles.

These and other objects of the invention will be apparent from the following detailed description and the accompanying drawings in which:

FIG. 1 is a transverse section through the top run of a troughing roll assembly in normal operating position according to the present invention.

FIG. 2 is a view similar to FIG. 1, but showing the roller assembly lowered from the trough belt.

FIG. 3 is a partial side elevation of an inclined roller and its mounting on the support frame of the troughing roll assembly in normal operating position, as shown in FIG. 1.

FIG. 4 is a transverse section taken on the line 4—4 of FIG. 3.

FIG. 5 is a vertical section taken on the line 5—5 of FIG. 3.

FIG. 6 is a partial horizontal section of the right hand end of FIG. 4, showing the mounting on the support frame of the troughing roll assembly in the lowered position as shown in FIG. 2.

FIG. 7 is a view similar to FIG. 3, but showing a modified form fastening device.

FIG. 8 is a side elevation of the arrangement shown in FIG. 7 with the fastening device released so the roll assembly is in the lowered position.

FIG. 9 is an end view of the locking device shown in FIGS. 7 and 8, taken on the line 9—9 of FIG. 7.

FIG. 10 is a detail view of the universal joint connecting the idler rolls of the troughing roll assembly.

Referring to the drawings, FIGS. 1 and 2 illustrate a typical assembly of the top run of a trough belt conveyor which includes one or more horizontal rolls 5 and inclined rolls 6 and 7 which support the conveyor belt 8 in trough form.

The rolls 5, 6 and 7 are interconnected by the universal joints 9 shown in detail in FIG. 10 consisting of a pair of linked shackles or clevises 10 connected to the stub shafts 5a and 6a by the pins 11, and together with the conveyor belt 8 are supported between the side support frames 12-13 by means of the fastening devices 14 which are mounted on the side support frames for pivotal movement on the pivot pins 15 illustrated in FIG. 3 secured on the side frames 12-13.

Referring now to FIGS. 3 to 6, the fastening devices 14 each include a suspension plate 16 pivotally mounted intermediate of its length on the pivot pins 15 which are provided with a head or flange 17 to retain the plate 16 on the pin 15, parallel with the side frames 12-13.

One end of the plate 16 is bent outwardly at right angles as indicated at 18, while the opposite end of the plate 16 is offset away from the frames 12-13 in a plane parallel to the plane of the mid portion of the plate 16 supported on the pivot pin 15, as indicated at 19.

The portion 19 of the plate 16 is extended with a reduced width as indicated at 22 in order to receive a lever tool such as a length of pipe, not shown, for use by an operator in taking up the weight of the catenary idler assembly when the plate 16 or 16' is to be rotated from the position shown in FIG. 7 to the position shown in FIG. 8.

The end 18 of the plate 16 has a vertically disposed slot 20, while the offset end 19 of the plate has a horizontally disposed slot 21.

A connecting means such as a connector 23 is fitted through the vertically disposed slot 20 in the end 18 of the plate 16 and the free ends of the connector 23 are pivotally connected to the shaft 24 of the inclined roll 6 by means of a bolt 25.

The offset end 19 of the plate 16 is held in the belt supporting position relative to the side support frame 12-13 by means of the locking member 26 which is captive mounted in the side support frame 12-13 by a pin 27 shown in FIG. 4. The locking member 26 has a push-pull movement, as indicated by the arrow 28 in FIG. 6 and has a rotative movement, as indicated by the arrow 29 in FIG. 3. The locking member 26 in the form of a cylindrical rod has a long leg 30 located on the side of the support frames 12-13, opposite from the plate 16, while the short leg 31 of the locking member 26 is adapted to pass through the horizontally disposed slot 21 and, when the locking member 26 is rotated into the operative position shown in FIGS. 3, 4 and 7, holds the plate 16 in the operative position against rotation and consequently holds the troughing rolls 5, 6 and 7 and the conveyor belt 8 in a trough forming position.

When the short leg 31 of the locking member 26 is withdrawn through the slot 21 in the plate 16, it takes a position in the space A between the surface 32 of the support frames 12-13 and the plate 16 to permit rotation of the plate on its pivot 15 and lowering of the troughing rolls 5, 6 and 7 away from the conveyor belt 8.

In FIGS. 7 and 8 there is illustrated a modified form of the fastening device, particularly adapted to accommodate and support various widths and trough angle of conveyor belts. The plate 16' is pivotally mounted intermediate of its length and has its end portion 33 bent outwardly at right angles to the plane of the body of the plate, but disposed at an angle with respect to the longitudinal axis of the plate passing through the pivot pin 15. This end portion 33 has a slot 34 and the connector 35, shown in solid lines, is fitted through the slot 34 and has its free ends pivotally connected to the shaft 24 of an inclined roll 6 in the manner illustrated in FIGS. 3 and 4.

As shown in solid lines in FIGS. 7 and 8, the connector 35 rests on the edge portion 36 of the angled portion 33 of the plate 16' and illustrates the position of a troughing roll assembly for the support of a conveyor belt of maximum width.

For the support of a conveyor belt of minimum width, the troughing roll assembly employs a connector 35' shown in dotted lines. The connector 35' rests on the edge portion 37 of the end portion 33 of the plate 16'. Connectors 35-35' may vary in length in order to further accommodate various widths of conveyor belts within the width of the fixed side frames 12-13.

In the operation of this invention and that form of the invention illustrated in detail in FIGS. 3 and 4, the plate 16 is pivotally mounted on the inner face of the stationary frame structure 12-13 of the conveyor belt system and held in the position shown by the locking member 26 so that its end portion 18 is aligned with the desired location of the axis of the troughing roll assembly, and the connector 23 has a length such that when the plate 16 is in the position shown in FIG. 3, the rolls 5, 6 and 7 will take a position shown in FIG. 1 where the rolls are in contact with the under surface of the conveyor belt 8 and deform the belt to take the desired trough form. The plate 16 is held in this position by inserting the short end 31 of the locking member 26 through the slot 21 in the offset end 19 of the plate 16. The locking member 26 being free to rotate on the frame structure will hang vertically and the weight of the idler rollers 5, 6 and 7 suspended from the opposite end 18 of the plate 16 will be applied between the plate and the locking member 26 to hold the locking member firmly in the plate locking position.

While the plate 16 is in the locked position shown in FIG. 3, any movement in the conveyor belt 8 due to variation of the load of material on the belt will be translated through the suspension system of the rolls and the plate 18 will be taken up by the pivot pins 15.

In order to unlock the plate 16 from the position shown in FIGS. 3 and 4, the pressure of the plate on the locking member must be relieved by use of a suitable tool such as a length of pipe engaged with the reduced end 22 of the plate to permit withdrawal of the short end 31 of the locking member 26 through the slot 21 and into the space A between the frame and the plate, thus permitting the plate to rotate about its pivot 15 and the lowering of the troughing rolls from under the conveyor belt to the position shown in FIG. 2.

FIG. 1 shows a fastening device 14 on each side of the catenary troughing roll assembly. It will be apparent to those skilled in the art that in some circumstances only one fastening device of the present invention may be required on one side of the troughing roll assembly. The other side may have a permanent connection.

The lowering of one roller assembly clear of the conveyor belt detracts very little from the overall support of the belt while permitting the lowered roller assembly to be serviced either by repair of the rollers or having the rollers replaced, all without interruption of the conveyor belt operation.

The operation of the arrangement shown in FIGS. 7 and 8 is similar to that above described with the additional feature that where the spacing of the side frame structures permits, various widths of conveyor belts can be accommodated by supporting the connectors 35 on either the lower edge portion 37 or upper edge portion 36 of the end portion 33 of the plate 16'. The connectors 35-35' can be replaced by others of different length in order to accommodate various widths of conveyor belts and troughing angles.

With the above described apparatus, the fastening devices in a troughing roll assembly can be of simple and relatively cheap design capable of quick positioning, either in the operative position or in a servicing position. The method of locking and unlocking the fastening devices can be effected with a minimum of effort with no loose parts to be accounted for with the result that servicing of the apparatus can be effected with a minimum of effort without having to close down the running of the conveyor. Furthermore, by changing the hanging of the connector 35 or 35', as illustrated in FIGS. 7 and 8, the overall suspension distance of the idler rolls can be increased or decreased to accommodate various widths of conveyor belts or change the trough angle of the belt. Also, by changing the length of the J connectors, similar results can be obtained all within a supporting structure of standard width.

The embodiments of the invention in which an exclusive property or privilege is claimed are defined as follows:

1. A fastening device for securing at least one end shaft of a catenary troughing roll assembly to a fixed side frame for support of a conveyor belt, the fastening device comprising a suspension plate pivotably mounted intermediate of its length on the fixed side frame, connecting means extended from one end of the suspension plate and pivotably secured to the end shaft of the catenary troughing roll assembly and locking means mounted on the fixed frame and engageable with the other end of the suspension plate opposite from the connecting means, the locking means in one position holding the troughing roll assembly to support the conveyor belt in an operative location and in the other position permitting rotation of the suspension plate and lowering the roll assembly from contact with the conveyor belt; wherein the one end of the suspension plate from which the connecting means is suspended is bent at right angles with respect to the plane of the plate and has a vertically disposed slot through which the connecting means is engaged, the slot extending above and below the longitudinal axis of the suspension plate passing through the pivot mounting of the suspension plate on the fixed frame; the slotted vertically bent end of the suspension plate being disposed in an oblique angular plane with respect to the longitudinal axis of the suspension plate passing through the pivot mounting of the suspension plate on the fixed frame to provide two spaced supporting points for said connecting means, one of said supporting points being disposed above the longitudinal axis of the suspension plate to accommmodate a maximum width conveyor belt and the other of said supporting points being disposed below the longitudinal axis of the suspension plate to accommodate a minimum width conveyor belt.

2. The fastening device as set forth in claim 1 in which the other end of the suspension plate opposite from the connecting means has a horizontally disposed slot on the longitudinal axis of the suspension plate passing through the pivot mounting of the suspension plate on the fixed frame, the locking means adapted to engage in the horizontally disposed slot to lock the suspension plate against rotation on its pivot.

3. The fastening device as set forth in claim 2 in which the other end of the suspension plate opposite from the connecting means is offset in a plane parallel to the fixed frame to leave a space between the fixed frame and the suspension plate, and a portion of the locking means engageable in the horizontally disposed slot is withdrawable into the space between the fixed frame and the suspension plate.

4. The fastening device as set forth in claim 2 in which the locking means is captively mounted in the fixed frame for push-pull movement to engage with the suspension plate and for rotative movement to lock the suspension plate and the catenary troughing roll assembly in the operative location supporting the conveyor belt.

5. The fastening device as set forth in claim 2 in which the locking means is a Z-shaped rod with the mid portion thereof being captive mounted in the fixed frame, and one end portion adapted to pass through the horizontally disposed slot in the suspension plate to prevent the suspension plate from pivoting.

6. The fastening device as set forth in claim 5 in which the other end of the suspension plate opposite from the connecting means is offset in a plane parallel to the fixed frame to leave a space between the fixed frame and the suspension plate, and the one end portion of the Z-shaped rod passes through the horizontally disposed slot in the suspension plate is rotatably engaged with an outside surface of the suspension plate opposite from the fixed frame.

7. The fastening device as set forth in claim 1 in which the connecting means is a connector with a sufficient length to accommodate a minimum clearance between the conveyor belt and the fixed frame and is replaceable by another connector of a different length to accommodate a maximum clearance between the conveyor belt and fixed frame to subsequently effect variation in a troughing angle of the conveyor belt.

8. The fastening device as set forth in claim 3 in which the other end of the suspension plate offset in a plane parallel to the fixed frame is extended beyond the horizontally disposed slot to receive a load carrying tool, the tool operable to relieve the pressure on the locking means when the suspension plate is rotated from one position to the other position.

9. The fastening device as set forth in claim 1 in which the catenary troughing roll assembly includes at least one horizontally disposed roll and at least a pair of angled rolls, each of said rolls having a stub shaft, and universal joints connecting the stub shafts of adjacent rolls, the universal joints each comprising a pair of linked clevises connected to the stub shafts using pins.

* * * * *